United States Patent [19]
Herbst et al.

[11] Patent Number: 5,611,907
[45] Date of Patent: Mar. 18, 1997

[54] ELECTROLYTIC TREATMENT DEVICE AND METHOD FOR USING SAME

[75] Inventors: Robert J. Herbst; F. William Gilmore, both of Denver, Colo.; Scott W. Powell, West Jordan, Utah

[73] Assignee: Global Water Industries, Inc., Denver, Colo.

[21] Appl. No.: 487,607

[22] Filed: Jun. 7, 1995

Related U.S. Application Data

[63] Continuation-in-part of Ser. No. 229,028, Apr. 18, 1994, Pat. No. 5,423,962.

[51] Int. Cl.$^6$ .............................. C02F 1/461; C02F 1/463
[52] U.S. Cl. ...................... 205/742; 205/751; 204/554; 204/275; 204/660
[58] Field of Search .................................. 204/149, 152, 204/186, 275, 302, 554, 660; 205/742, 751

[56] References Cited

U.S. PATENT DOCUMENTS

| | | | |
|---|---|---|---|
| 672,231 | 4/1901 | Lacomme | 204/275 |
| 820,113 | 5/1906 | Hinkson | 204/272 |
| 2,864,750 | 12/1958 | Hughes | 204/149 |
| 3,247,091 | 4/1966 | Stuetzer | 204/302 |
| 3,314,872 | 4/1967 | Waterman et al. | 204/302 |
| 3,679,556 | 9/1968 | Doevenspeck | 204/269 |
| 3,925,176 | 12/1975 | Okert | 204/152 |
| 3,972,795 | 8/1976 | Goens | 204/269 |
| 4,175,026 | 11/1979 | Houseman | 204/272 |
| 4,293,400 | 10/1981 | Liggett | 204/302 |
| 4,347,110 | 8/1982 | Joyce et al. | 204/149 |
| 4,378,276 | 3/1983 | Liggett | 204/149 |
| 4,790,923 | 12/1988 | Stillman | 204/268 |
| 4,872,959 | 10/1989 | Herbst et al. | 204/109 |
| 5,043,050 | 8/1991 | Herbst | 204/272 |
| 5,271,814 | 12/1993 | Metzler | 204/149 |
| 5,423,962 | 6/1995 | Herbst | 204/149 |

*Primary Examiner*—Arun S. Phasge
*Attorney, Agent, or Firm*—Sheridan Ross P.C.

[57] ABSTRACT

An apparatus for the electrolytic treatment of liquid waste streams and a method for treating waste streams using the apparatus. The apparatus includes improved design to maximize the efficiency of electrolytic treatment of the waste stream.

28 Claims, 7 Drawing Sheets

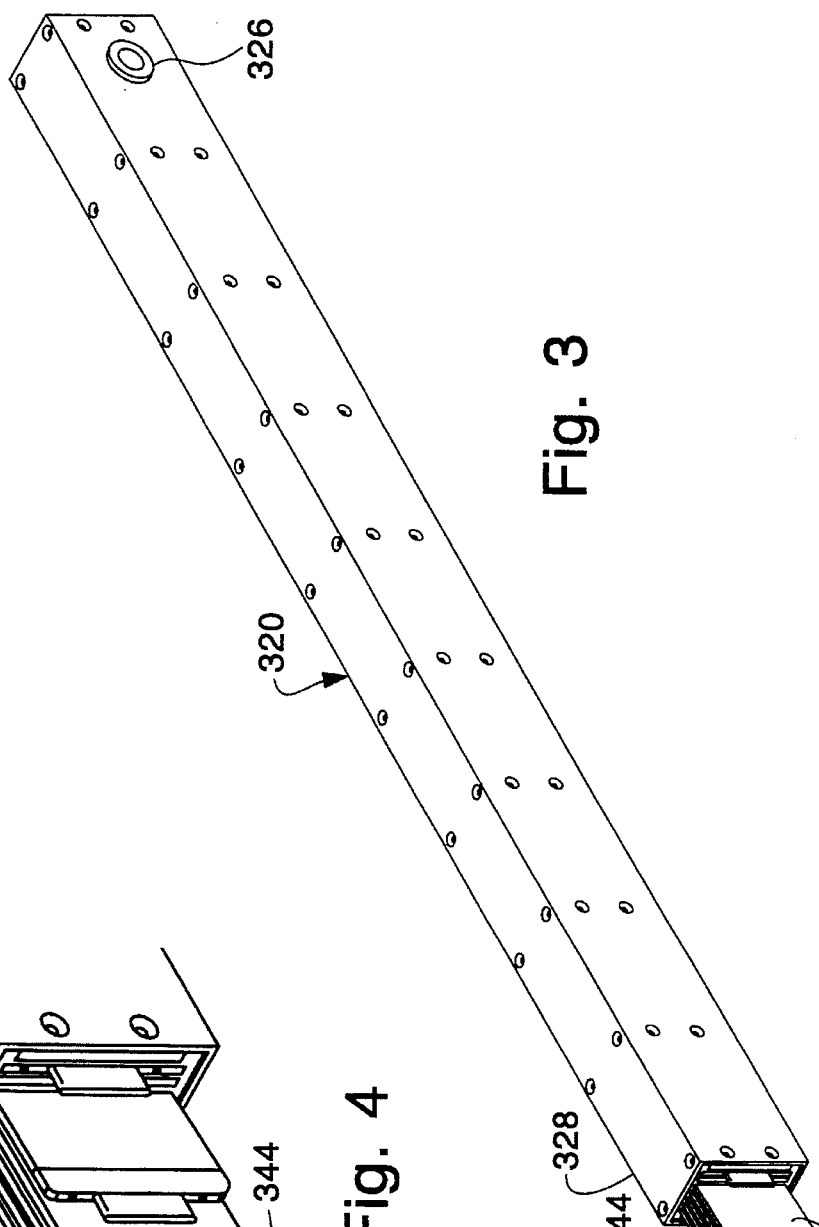
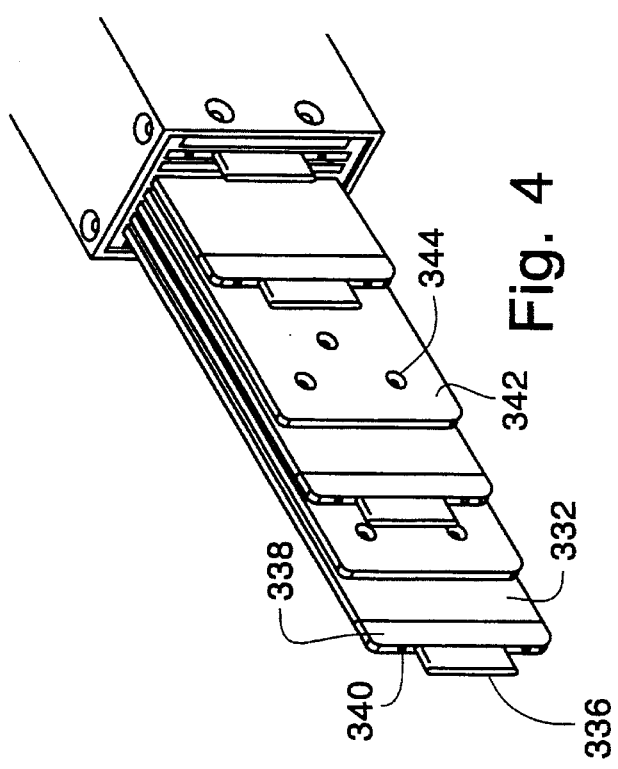

ELECTROLYTIC TREATMENT DEVICE AND METHOD FOR USING SAME

This application is a continuation-in-part of U.S. patent application Ser. No. 08/229,028, filed on Apr. 18, 1994 now U.S. Pat. No. 5,423,962.

BACKGROUND OF THE INVENTION

1. Field of the Invention

The present invention relates to a device and method for the electrolytic treatment of liquids, particularly for the electrolytic treatment of aqueous-based waste streams to cause impurities in the waste stream to coagulate or otherwise precipitate out of the waste stream.

2. Description of Related Art

It is known to electrolytically treat liquids, such as aqueous-based solutions, to cause impurities to coagulate or otherwise precipitate from the solution. In such a treatment method, an electric field is applied to a liquid contained in a treatment chamber in order to precipitate impurities. In some of these devices, the electrodes are metal tubes or pipes, as is disclosed in U.S. Pat. No. 4,293,400 by Liggett and U.S. Pat. No. 4,872,959 by Herbst et al. It has been found that at least about three hours are required to repair or replace the electrode tubes in the concentric tube design disclosed in these patents. This amount of down time is unacceptable for most commercial applications.

U.S. Pat. No. 5,043,050 by Herbst discloses a device in which the electrodes are flat. However, when this particular device is placed in a high volume treatment facility, it is difficult to adequately seal the edges of the unit, particularly after long periods of use. Moreover, uneven liquid flow between the electrodes can produce plugging on the side with the lower flow rate, possibly forming a resistive bridge of the plugged material which causes heat build-up and malfunction of the treatment unit.

Various other designs have been proposed for electrolytic treatment units. U.S. Pat. No. 5,271,814 by Metzler discloses a thin film electrocoagulation apparatus that utilizes a cascading path among electrodes for the treatment of liquids. However, it is difficult to maintain adequate flow velocity within this cascade-type structure. Inadequate flow velocity leads to plugging of the contaminant material, as is discussed above. Further, thin film devices do not supply sufficient current to the waste stream to form the most stable, and therefore most desirable, precipitate compounds. Thin film electrocoagulation devices operate by forming a film of contaminant on the electrode plates and passing the current through that film. It is not possible to reverse the electrode polarity in a thin film device since a polarity reversal will destroy the film.

U.S. Pat. No. 3,925,176 by Okert discloses an apparatus for the treatment of sewage that includes an electrolytic treatment device. The device comprises a plurality of electrode plates around which the liquid sewage to be treated is passed. However, the design of the treatment chamber disclosed by Okert is susceptible to plugging. Further, the electrode plates are not easily, nor individually, removable from the treatment chamber for replacement and the plates cannot be powered in a series electrical connection, which is desirable for many applications.

U.S. Pat. No. 3,679,556 by Doevenspeck discloses an apparatus for treating liquids, such as for the pasteurization and sterilization of beer. The apparatus includes a cascade container of positive and negative carbon electrodes. An induction coil is connected to the container on the upstream side. However, this device has many of the same drawbacks as the Okert device discussed above.

It would be advantageous to provide an electrolytic treatment device for treating liquid waste streams which could operate in an efficient and economical manner. It would be particularly advantageous if the electrodes could be easily removed for replacement. It would be advantageous if the device was not susceptible to plugging. It would be advantageous if the electrodes in the device could be easily switched from a series electrical connection to a parallel electrical connection.

SUMMARY OF THE INVENTION

In accordance with one aspect of the present invention, there is provided a method for electrolytically treating a waste stream. Preferably, the method includes the steps of first passing the waste stream through polarizing means having an electric potential that is different than ground potential and then passing the waste stream through an electric field established between a first elongate electrode having a first potential and a second elongate electrode having a second potential that is different from the first potential. The waste stream is then passed between the second elongate electrode and a third elongate electrode, the third elongate electrode having a third potential that is different from the second potential. The waste stream is then treated to remove solids therefrom.

According to a preferred embodiment of this method, the waste stream includes an aqueous-based solution. Further, the polarizing means can include an elongate conductive member, such as a metal pipe, or can include the first elongate electrode. The first elongate electrode and the third elongate electrode can advantageously have substantially the same potential. A further step can include passing the waste stream between the third elongate electrode and a fourth elongate electrode having a fourth potential that is different than the third potential. Preferably, the first elongate electrode and the third elongate electrode have substantially the same electric potential while the second elongate electrode and the fourth elongate electrode have substantially the same potential.

Further preferred embodiments of this aspect of the invention include the step of diluting the waste stream with treated water, particularly if the waste stream has a high solids content. Additives, such as coagulants, can also be added to the waste stream. Preferably, the waste stream remains in contact with an electric field for at least about 2 seconds and more preferably at least about 5 seconds. The flow velocity can be at least about 5 linear feet per second and is more preferably at least about 20 linear feet per second.

According to another aspect of the present invention, a method for electrolytically treating an aqueous-based solution is provided, the includes the steps of contacting the aqueous-based solution with a conductive member having an electric potential above ground potential to polarize the solution, then passing the aqueous-based solution through an electric field established between a first elongate electrode having a first potential and a second elongate electrode having a second potential that is different from the first potential, then passing the aqueous-based solution through an electric field established between the second elongate electrode and a third elongate electrode, the third elongate electrode having a third potential that is different from the second potential, and then treating the aqueous-based solution to remove solids therefrom.

According to another aspect of the present invention, an electrolytic treatment device is provided. The device includes elongate housing means having a first end and a second end and having at least two pair of oppositely opposed interior surfaces defining a treatment chamber within the housing means. At least two elongate electrode plates are secured within the treatment chamber in spaced apart relation and defining at least three elongate channels within the treatment chamber. Aperture means are located at one end of the electrode plates, wherein adjacent electrode plates include aperture means at opposite ends of the electrode plates when the plates are secured within the housing, to define a continuous flow path for a liquid such that the liquid can pass through substantially the entire length of each of the channels. The housing means includes means for introducing liquid into the treatment chamber and means for removing the liquid from the treatment chamber. Means for applying voltages to the electrode plates are also provided.

According to preferred embodiments of this device, the elongate electrodes plates are metallic plates. Further, the device preferably includes at least about four electrode plates secured within the housing. Also, the electrode plates are preferably slidably removable from the housing means to facilitate fast and efficient repair or replacement of the plates, if necessary.

According to yet another aspect of the present invention, an electrolytic treatment apparatus is provided. The apparatus includes an elongate conductive conduit and elongate housing means having a first end and a second end and having at least two pair of oppositely opposed interior surfaces defining a treatment chamber within the housing means. At least two elongate electrode plates are secured within the treatment chamber in spaced apart relation and defining at least three elongate channels within the treatment chamber for the electrolytic treatment of liquids. Aperture means are located at one end of the electrode plates, wherein adjacent electrode plates include aperture means at opposite ends of the electrode plates when the plates are secured within the housing to define a continuous flow path for a liquid such that the liquid can pass through substantially the entire length of each of the channels. The apparatus also includes means for applying voltages to the electrode plates and the conductive conduit, means for introducing liquid into the treatment chamber from the conductive conduit, means for removing the liquid from the treatment chamber, and means for separating solids from the liquid after being treated in the chamber.

BRIEF DESCRIPTION OF THE DRAWINGS

FIGS. 3 and 4 illustrate an alternative view of a device for the electrolytic treatment of a waste stream according to an embodiment of the invention.

DETAILED DESCRIPTION OF THE INVENTION

Figure 1:
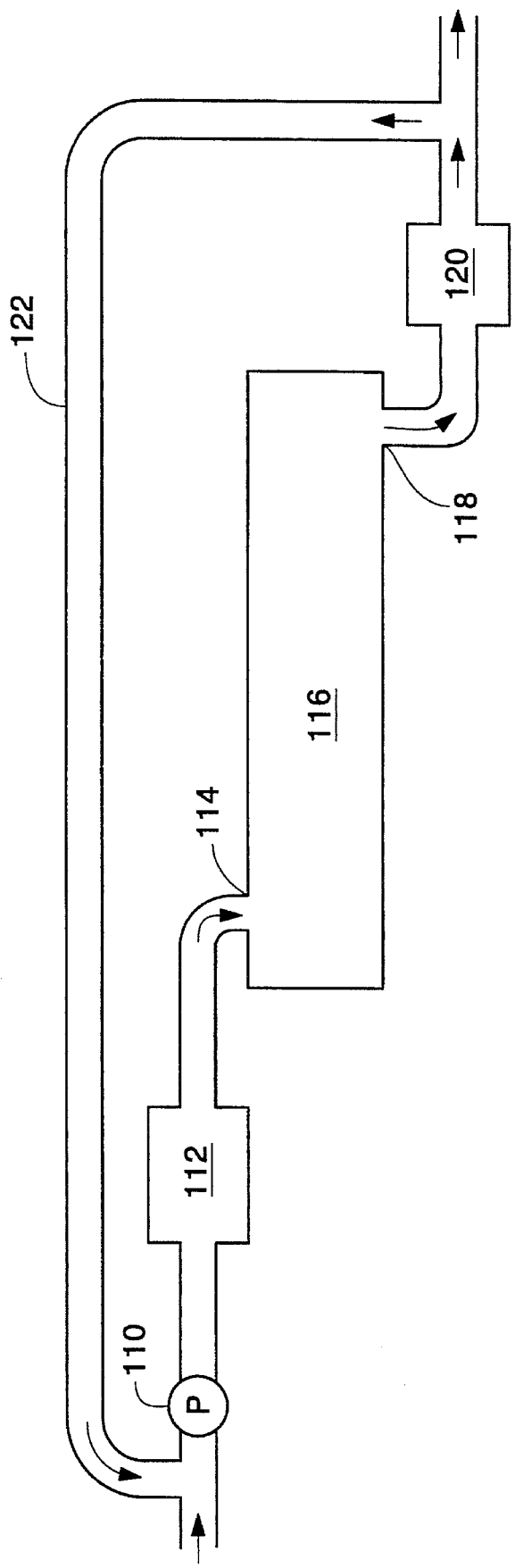
FIG. 1 is a block diagram of an apparatus for the electrolytic treatment of waste streams according to an embodiment of the invention.

According to one aspect of the present invention, a method for the treatment of waste streams to remove impurities and the like is provided that includes the electrolytical treatment of the waste stream. The method according to the present invention makes use of a number of chemical and electrochemical phenomena that have been found to be beneficial for the treatment of such streams, particularly waste water streams. Accordingly, the present invention is applicable to waste water streams such as waste water from, for example, sewage plants, electroplating operations, food processing plants, fabric die facilities, and the like. The present invention is particularly applicable to oil-water emulsions. The term waste streams, as used herein, refers to such waste water streams and other liquid waste streams, including some non-aqueous liquid streams.

The waste streams that are treated according to the present invention preferably have a solids loading of about 5 volume percent or less and more preferably have a solids loading of about 1 volume percent or less. It has been found that solids loading in excess of about 5 volume percent can insulate the waste stream and inhibit the effect of the potential difference applied to the waste stream. When a feed stream has a solids loading in excess of the preferred solids loading, additional liquid (e.g. water) can be added to the waste stream for dilution purposes. It has been found to be particularly advantageous to recycle a portion of the treated waste stream back into the feed waste stream since some residual charge remains after treatment which is beneficial to subsequent treatment of the diluted waste stream.

Preferably, the first step in the electrolytic treatment of the waste stream is the polarization of the waste stream. For example, the waste stream can be passed through a conductive member having an electric potential that is different than ground potential. Alternatively, the waste stream can be polarized as it enters the treatment chamber of the present invention and passes between the neutral chamber wall and the first charged electrode. The polarization of the waste stream has advantageously been found to enhance the subsequent electrolytic treatment of the waste stream, particularly when metals are being removed from an aqueous solution.

The waste stream is then passed through an electric field established between a first elongate electrode and a second elongate electrode. The electrodes preferably establish a sufficient electric current such that the most stable form of metal precipitates form, e.g. the metal oxides.

It is preferred according to the present invention that the contact time of the waste stream with the electrodes be increased. Thus, the waste stream can pass through one or more apertures at the end of the second electrode and then pass between the second electrode and a third electrode. This path through the treatment chamber continues until the waste stream passes between all of the electrodes and exits the treatment chamber. To assure adequate treatment of the waste stream, it is generally preferred that the waste stream remain in contact with active electrodes for at least about 2 seconds and more preferably for at least about 5 seconds. Such contact times can be achieved using the device of the present invention, having a 12 foot length, while maintaining a feed rate of about 25 gallons per minute.

By using the electrolytic treatment device of the present invention, described in more detail hereinbelow, it is possible to maintain a high flow velocity through the device. The preferred velocity can vary as a function of the solids content of the waste stream (higher solids content requiring higher velocity to reduce clogging), however, the average velocity of the stream is preferably from about 5 to about 40 feet per second through the treatment chamber.

As a result of the foregoing conditions, a number of chemical and electrochemical phenomena occur in the waste stream that cause contaminants in solution to precipitate, colloidal particles to coagulate and other chemical phenomena to occur.

One phenomena that occurs as a result of the method according to the present invention is the driving of equilibrium reactions by the electromotive force (EMF) provided by an electrolytic cell. The application of sufficient EMF causes certain chemical reactions to occur under less than equilibrium conditions. For example, copper metal is soluble in water to some extent, about 180 parts per billion (ppb). However, the amount of copper in solution can be reduced to about 5 ppb by the application of sufficient EMF.

In addition to driving chemical reactions and decreasing the solubility of certain metals in the waste water, the application of sufficient EMF also forms oxide crystals, which are highly stable compounds that can easily be separated from the waste water. The formation of such oxides has been found to not only depend upon the application of sufficiently high EMF, but also on the amount of contact time with the electrodes. Devices such as thin film electrocoagulation devices typically do not form oxides, but form hydroxides, which are more susceptible to dissolution due to, for example, changes in pH.

The flow of electrons created by the electrolytic cell also results in the breakdown of water/oil emulsions by removing the oil from solution. The free electrons or protons combine with the hydrophilic surface of the oil to make the oil hydrophobic. As a result, the oil congeals and is more susceptible to removal using known techniques.

In addition, the electrolysis of water occurs during treatment with electrodes. If too little EMF is supplied by the electrodes, then the water will form $OH^-$ ions and metal hydroxides will have a tendency to form as a result. Increasing the applied EMF breaks the $OH^-$ into $H^+$ and $O^{2-}$, which results in the formation of metal oxides, which are more stable than hydroxides, as is discussed above.

In addition, colloidal particles, which stay suspended in the waste water by virtue of the surface charge on the particle, can be more easily removed. The electrons and protons ($H^+$) are attracted to the colloids and neutralize the surface charge. The colloids are attracted to each other by gravity, effectively forming larger clusters of the particles which can sediment and be more easily removed.

Also, the method of the present invention can be effective at killing bacteria, which will burst due to the destruction of the cell wall. Bacteria generally have a positively charged interior with an aura of balancing negative charge on the outer surface. The supply of electrons destroys this equilibrium and the cell wall of the bacteria bursts as a result.

In addition, organic compounds can be neutralized. For example, carbon tetrachloride can be broken down into chlorine and an organic compound that is less toxic than carbon tetrachloride.

The chemical phenomena described hereinabove can be enhanced by the use of additives to the waste stream. For example, the pH of a waste stream can be altered by the addition of an acid or base to influence certain reactions. For example, by adding an acid to lower the pH to between about 3 and 4, the removal of chromium (Cr) in the form of an oxide ($Cr_2O_3$) is favored. Further, polymer coagulants can be added to assist the flocculation of fine particles. Such polymer coagulants are preselected for a given system, and can include, for example, long chain polyacrilimides.

Also, the waste stream can be seeded to facilitate the precipitation of certain matter from the solution. For example, iron or a heavy metal can be intentionally added to the waste stream for this purpose.

After electrolytic treatment, the waste stream can be treated to remove the solid impurities. For example, filters or centrifugal devices can be utilized. The waste streams can also be disposed in a tailings pond where the solids settle from the liquid medium.

According to another aspect of the present invention, a device for electrolytically treating waste streams as well as an apparatus incorporating such as device is provided. Preferred embodiments of the device and apparatus will be described with reference to the attached figures.

Referring to FIG. 1, there is illustrated a schematic block diagram of a system for the electrolytic treatment of a waste stream to precipitate or coagulate impurities from the waste stream. A pump 110 is used to move the waste stream through the system. Preferably, the pump 110 is a positive displacement pulsing feed pump. Such a pump creates a harmonic pushing effect that reduces the settling of heavier particles and reduces the amount of flow differential through the system. The pump 110 controls the flow velocity and volume of the waste stream into the system.

According to one preferred embodiment, the waste stream flows through a polarizing unit 112 which subjects the waste stream to a polarizing electric field prior to entering the electrolytic treatment device 116. The polarizing unit 112 can comprise a metal pipe, such as an iron pipe, that is connected to a source of electric power. Preferably, a unidirectional voltage is applied to the waste stream in the polarizing unit 112. The polarization of the waste stream in the polarizing unit 112 is believed to enhance the subsequent electrolytic treatment of the waste stream. However, the polarizing unit 112 is optional, and polarization of the waste stream can also occur in the front end of the electrolytic treatment device 116, as is discussed below. In some applications, higher polarizing voltages on the polarizing unit 112 than those used for the electrodes in the electrolytic treatment device 116 gives a more efficient operation of the apparatus.

The electrolytic treatment device 116 includes a plurality of elongate electrode plates in spaced apart relationship, as is discussed in detail hereinbelow. The configuration of the electrolytic treatment device 116 according to the present invention subjects the waste stream to an electric field for an effective amount of time. The waste stream enters the electrolytic treatment device 116 through an inlet 114 and after being treated in the electrolytic treatment device 116 the waste stream exits the device at an outlet 118.

The waste stream is then treated in a separation device 120 such as a filter or other suitable separation devices such as, for example, a centrifuge or a settling pond. According to a preferred embodiment, the waste stream flows into a holding tank, such as a V-bottom tank. It has been found that for most applications, some of the contaminants attach to bubbles (e.g. hydrogen bubbles) and float to the top of the tank. This floating material is continuously removed using, for example, a vacuum pump, and is then taken to a secondary separation step where the solids are separated from the water using, for example, a filter. Other contaminants sink to the bottom of the tank and form a sludge that must be removed using a pump. It is preferred to use a pump for this sludge that is controlled using a timing device to control the operation of the pump. This is advantageous since the time period can be set to be sufficient to permit the sludge that forms on the bottom to compact between pump cycles. This significantly reduces the amount of water that is drawn off with the sludge as compared to known separation devices.

If the incoming waste stream has a high solids loading (e.g. greater than about 5 volume percent), a recycle conduit 122 can be used to move treated waste stream back to dilute the incoming waste stream. It has been found that residual charge remains in the treated waste stream that is beneficial to subsequent treatment of the diluted waste stream.

Figure 2:
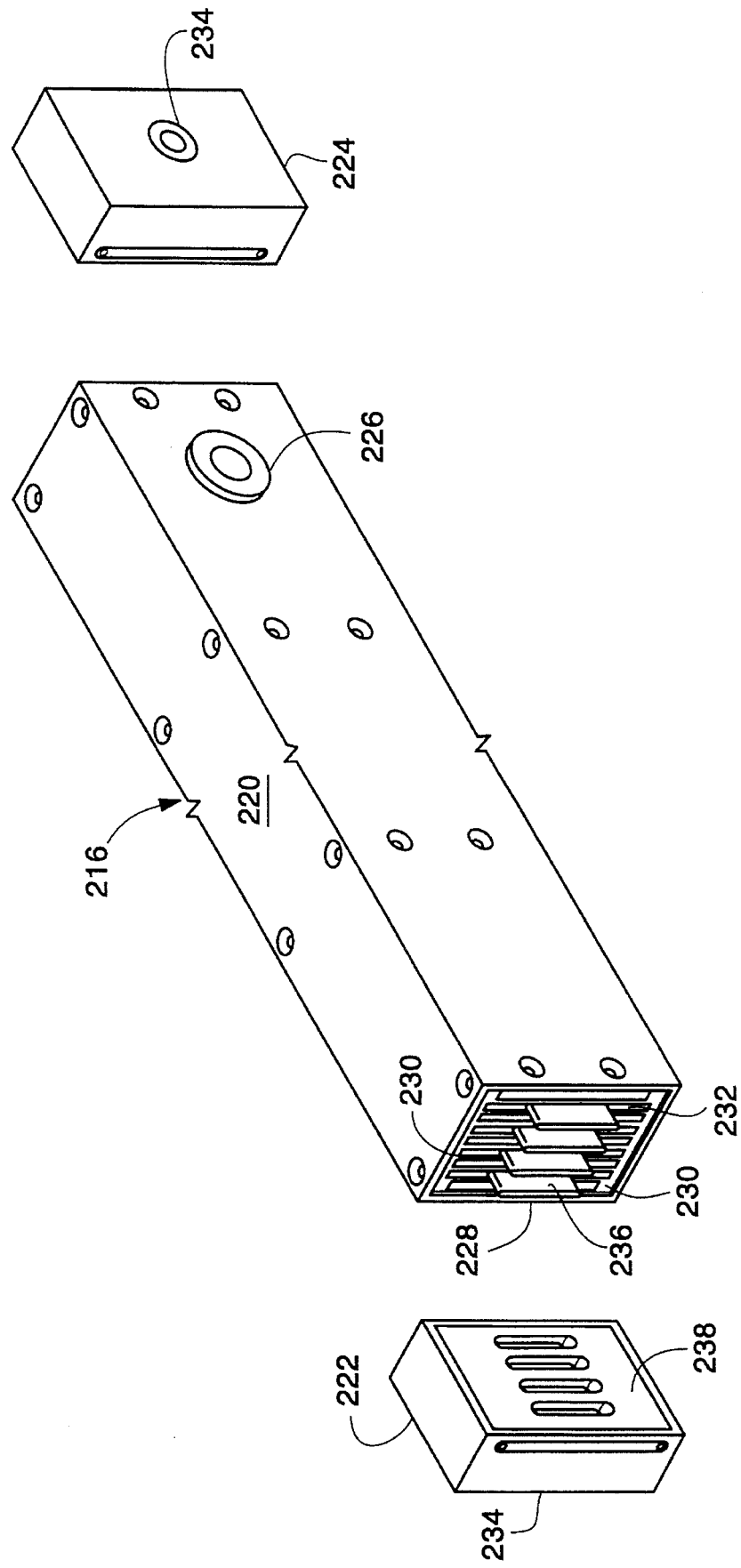
FIG. 2 illustrates a device for the electrolytic treatment of a waste stream according to an embodiment of the invention.

FIG. 2 illustrates an electrolytic treatment device 216 according to one preferred embodiment of the present invention. The device includes an elongate housing 220, a first end cap 222 and a second end cap 224. The elongate housing 220 can be made from, for example, a metal such as aluminum. Other housing materials can be used, depending on the nature of the waste stream being treated. For example, stainless steel could be advantageous if the waste stream was slightly caustic. The elongate housing 220 also includes a first inlet/outlet port 226 and a second inlet/outlet port, on the opposite side of the housing, which is not visible in FIG. 2. The elongate housing 220 includes two pair of opposed interior surfaces formed by the four sides of the housing, thus defining an interior treatment chamber wherein the waste stream will be electrolytically treated.

The elongate housing 220 defining a treatment chamber therein contains at least two electrode plates 232 within the treatment chamber. The embodiment illustrated in FIG. 2 illustrates seven electrode plates 232 within the chamber. Four of the electrode plates, in alternating positions, are illustrated in FIG. 2 with electrode projections 236 at the near end. The other three electrode plates have electrode projections 236 at the opposite end of the housing 220.

The electrode plates 232 are secured within the chamber to form a substantial seal against the interior surfaces to prevent the leakage of waste water between the plates. As illustrated in FIG. 2, the plates are secured on the upper and lower interior surfaces of the chamber by plate guides 230 which define a plurality of elongate grooves parallel to the major axis of the chamber which are adapted to receive and seal the electrode plates 232. The plates thus form a plurality of channels which are wide enough to permit the passage of waste water between adjacent electrode plates 232. In one embodiment, the distance between adjacent electrode plates 232 when secured in the treatment chamber is about 0.125 inches.

End caps 222 and 224 are secured to the ends of the main unit 220 during operation of the device. The cap assemblies 222 and 224 each include an electrode connection 234 adapted to facilitate the supply of power to the electrodes 232. The end caps are described in more detail below with reference to FIG. 7.

Turning to FIGS. 3 and 4, there is illustrated an elongate housing 320 with electrode plates 332 and 342 partially removed for purposes of illustration. As can be seen, the electrode plates 342 each include a plurality of apertures 344 adapted to permit waste water to flow from one side of the electrode plate to the other. It will be appreciated that the illustrated electrode plates 332 and 342 are substantially similar and differ only in their orientation in the housing 320. Thus, all of the plates include both apertures 344 and electrode projections 336. By alternating the orientation of adjacent electrode plates 332 and 342 within the chamber, an elongate path for the waste stream is defined within the chamber as the waste stream moves from the inlet port 326 to the outlet port 328. Although the inlet/outlet ports are illustrated at opposite end of the housing, it will be appreciated that these ports could be located at the same end.

The use of apertures 344 or similar aperture means according to the present invention is advantageous for treating waste streams. Prior devices of similar design utilize shorter electrode plates relative to the housing which would permit the waste stream to flow over the end of the electrode and into the next channel. However, these designs leave a substantial amount of dead-space near the top of the chamber which results in a build-up of solids, and eventually, clogging and electrical shorting of the device. Further, such a design does not permit the electrodes to be easily connected in series electrical connection. The aperture means of the present invention ensure sufficient turbulence at the ends of the treatment chamber that the likelihood of clogging and shorting due to solids build-up is significantly reduced. Although illustrated in the Figures as a plurality of circular apertures, it will be appreciated that the apertures can have virtually any shape and can include one or more apertures.

The electrode plates 332 and 342 are partially removed in FIGS. 3 and 4 for purposes of illustration. However, it is an important aspect of the present invention that the electrode plates are easily removable from the housing 320. The electrode plates 332 and 342 can be removed by simply removing one or both of the end caps (FIG. 2), which can be held on the ends of the chamber using bolts or similar connection means. The electrode plates can then be individually removed by simply sliding the plates out of the chamber. It is highly advantageous to have easily removable electrode plates since the plates often become depleted or is subject to scale build up on the surface of the electrode. Replacement of electrodes leads to a significant amount of down time in prior systems. Utilizing the apparatus of the present invention with individually removable electrodes permits one or more of the electrodes to be removed and replaced in a short amount of time. For example, it is feasible that one person could remove and replace seven electrode plates in less than about 5 minutes.

As is illustrated in FIG. 4, the electrodes include electrode projections 336 for connection to a source of power. In a preferred embodiment illustrated in FIG. 4, the electrode projections 336 are a part of a plate end 338 which is connected to the main body of the electrode plate using, for example, bolts 340. This design is advantageous, since the electrolytic device 320 can be easily switched from a parallel electrical connection to a series electrical connection by simply placing non-conductive plate ends 338 onto the ends of the inner electrode plates. As a result, only the outer plates will be connected to the power source, and the charge on the inner plates will be induced. If the plate ends 338 are all conductive, the electrode plates will be electrically connected in parallel. This design also reduces manufacturing costs associated with forming the electrode plates since the main body of the electrode is a simple rectangular bar.

Figure 5A:
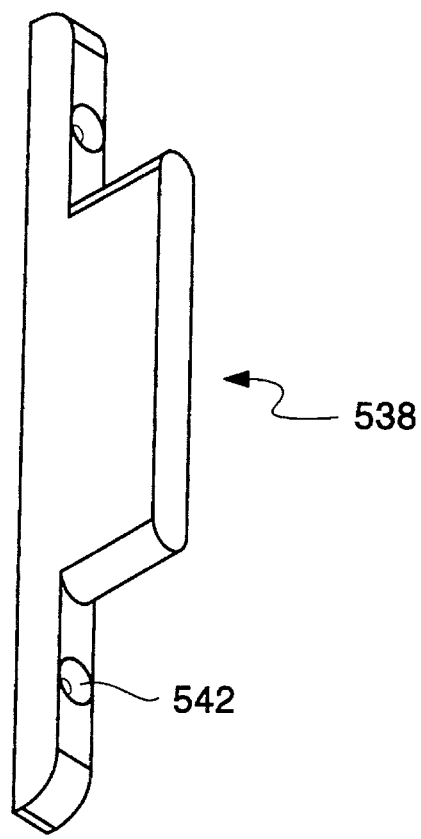
FIGS. 5a and 5b illustrate an electrode plate end according to an embodiment of the present invention.
Figure 5B:
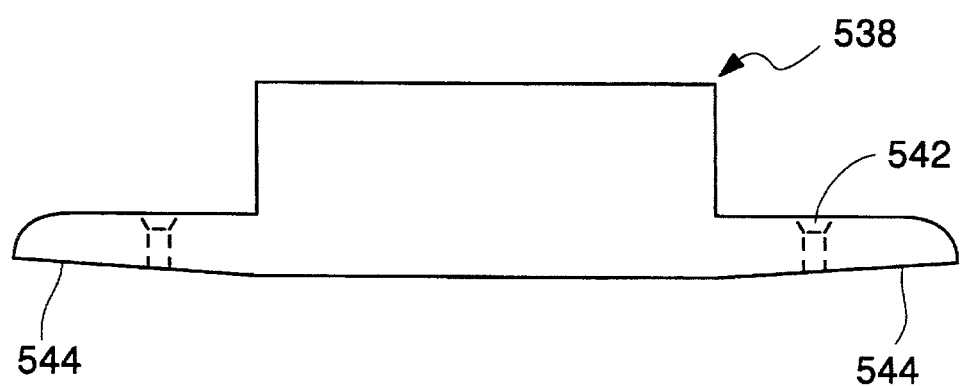

FIGS. 5a and 5b illustrate a plate end 538 in more detail. The plate end 538 can be made from a similar material as the main body of the electrode plate, such as aluminum, or can be made from an insulative material such as CPVC if that is desirable for insulating a particular electrode plate from the source of power. The plate end illustrated in FIGS. 5a and 5b include bores 542 adapted to engage a bolt for attaching the plate end 538 to the main electrode body. As is illustrated in FIG. 5b, the outer projections 544 of the plate end 538 can advantageously be chamfered so that the electrical current does not substantially pass through the connecting bolts. That is, the chamfer puts a compressive force onto the central portion of the plate end 538 so that the current is passed through the central portion, even if there is some degradation of the plate or plate end.

Figure 6A:
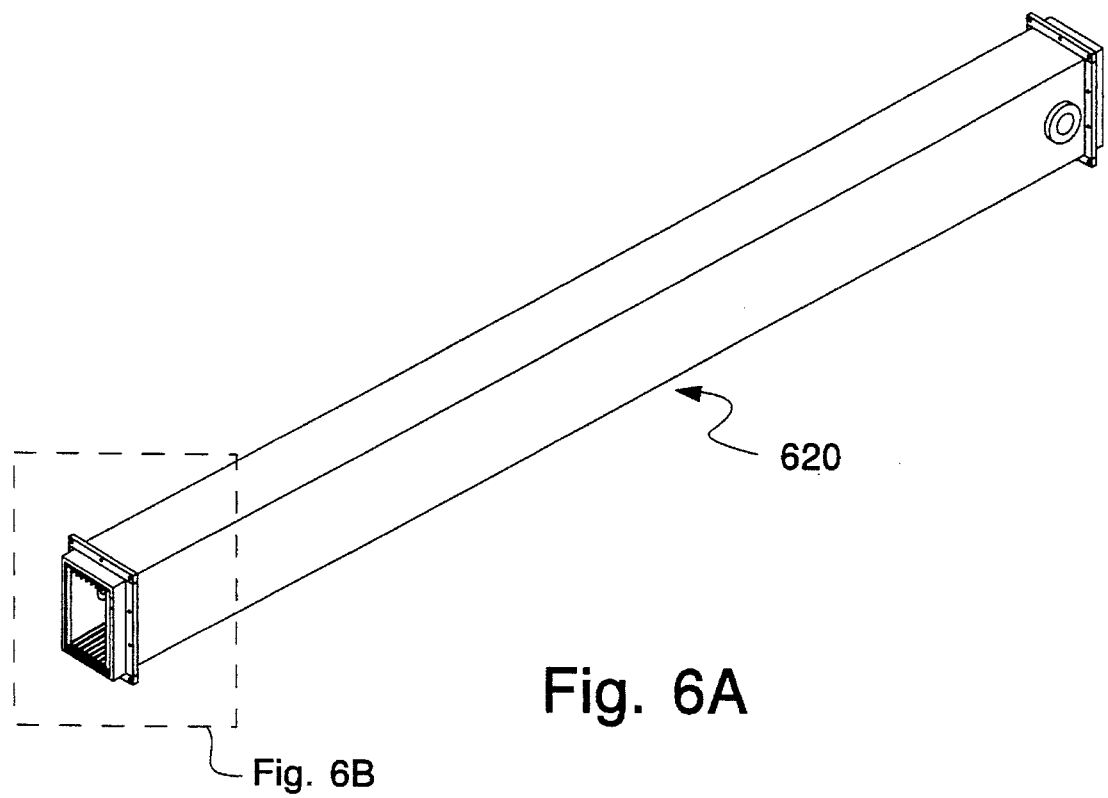
FIGS. 6a and 6b illustrate the treatment chamber of a device for electrolytically treating waste streams according to the present invention.
Figure 6B:
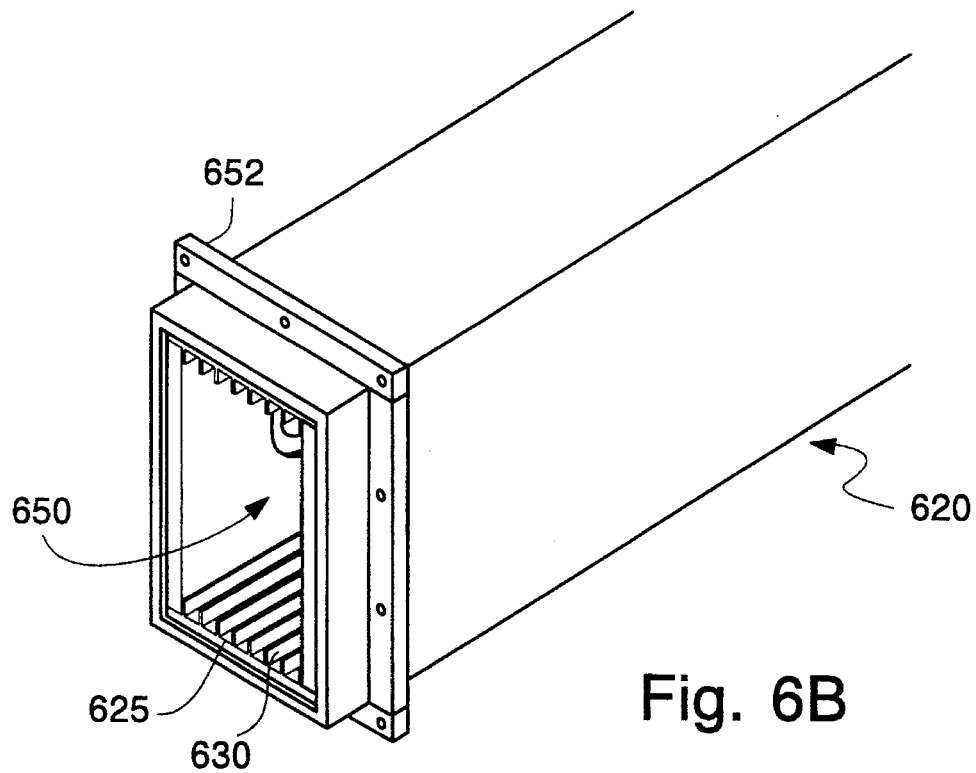

FIGS. 6a and 6b illustrate a housing 620 with the electrode plates removed. The four walls of the housing 620 define a treatment chamber 650 for the treatment of waste streams. An insert 625 on the top and bottom surfaces of the chamber 650 defines a plurality of plate guides 630 adapted to engage and substantially seal the electrode plates to minimize leakage of the waste stream. The insert can be made from a number of materials, including CPVC (chlorinated polyvinyl chloride). The housing 620 can also include an attachment ring 652 adapted to secure the end caps on the ends of the housing 620.

Figure 7:
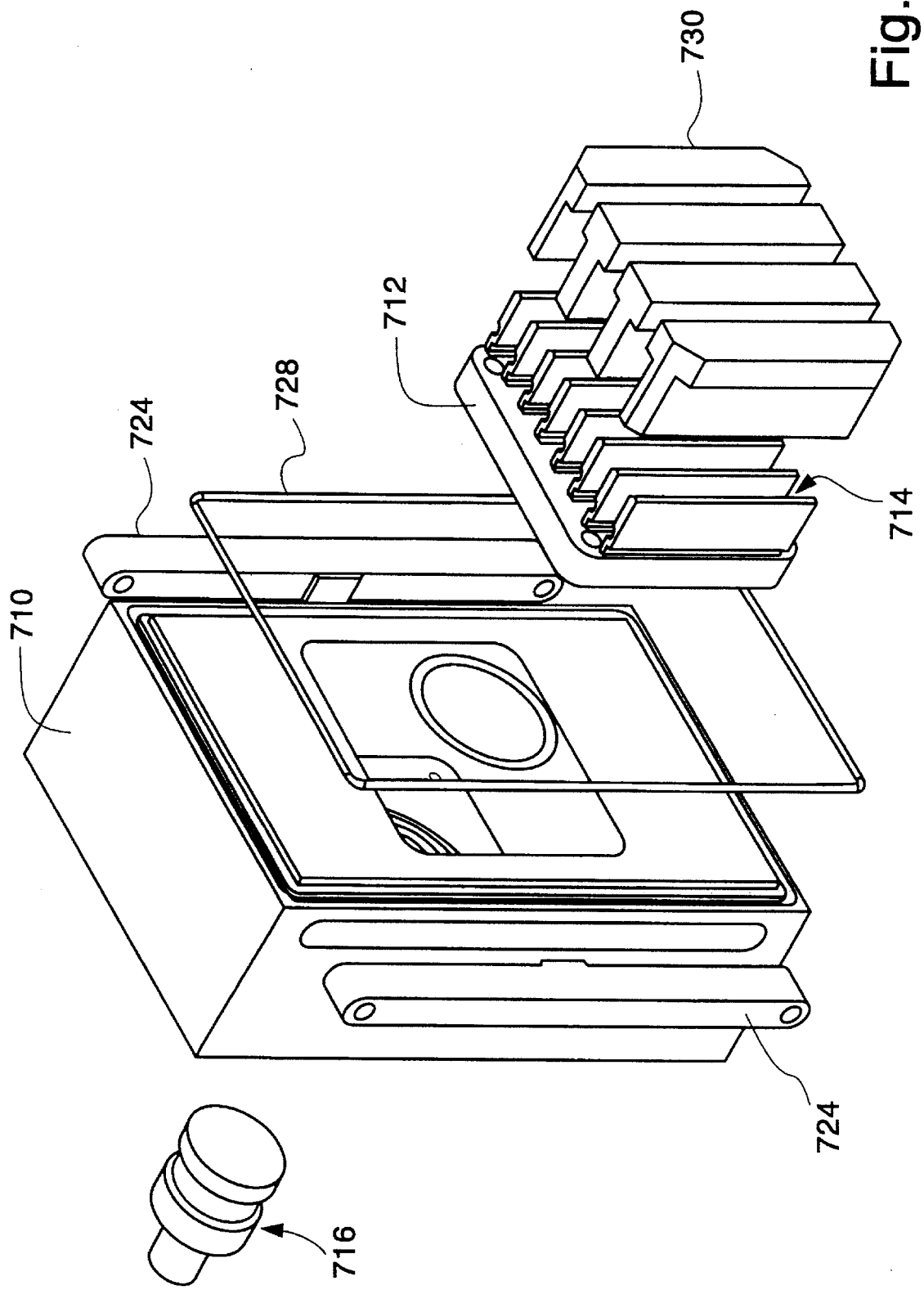
FIG. 7 illustrates a blown apart view of an end cap assembly useful in a electrolytic treatment device according to the present invention.

FIG. 7 illustrates a blown apart view of an end cap assembly. The cap assembly includes an insulative block 710 that can be fabricated from an electrically insulating material, such as CPVC. The insulative block is adapted to receive a conductor block 712 which is fabricated from an electrically conductive material such as a conductive stainless steel. The conductive block 712 includes a plurality of grooves 714 that are adapted to receive and electrically engage the electrode projections that extend from the electrode plates, as is described above. Electrical connection to the conductive block 712 is made by an electric terminal 716 which is connected to the rear of the insulative body 710 and electrically connects with the conductive blocks 712. A source of electrical power, either AC or DC, can then be coupled to the terminal 716. The polarity of the system can be easily switched by simply switching the polarity of the power connected to the terminals at the opposite ends of the device, thereby switching the polarity of opposing electrodes. The conductive blocks 712 can be held in place using lock rods (not illustrated) that slide through the insulative body 710 and through clamp bars 724, such that the clamp bars 724 squeeze the conductive block 712 and hence secure the electrode projections that are inserted into the grooves 714.

The following examples illustrate the benefits of the method and apparatus of the present invention when applied to various types of waste streams.

EXAMPLE 1

A waste water stream from a pork processing plant was treated using the method and device of the present invention. The results are summarized in Table I.

TABLE I

| Contaminant | Raw (mg/l) | Treated (mg/l) | Percent Removal |
|---|---|---|---|
| Total Kjeldahl nitrogen | 1119 | 59 | 94.7 |
| Nitrates | 21 | 12 | 42.9 |
| Nitrites | 0.35 | 0.47 | (34) |
| Phosphates | 120 | 2.5 | 97.9 |
| Ammonia | 49 | 19.4 | 60.4 |
| Total Suspended Solids | 14,040 | 60 | 99.6 |

TABLE I-continued

| Contaminant | Raw (mg/l) | Treated (mg/l) | Percent Removal |
|---|---|---|---|
| Biochemical Oxygen Demand | 11,580 | 397 | 96.6 |
| pH level | 6.8 | 10.2 | |

After treatment in the electrolytic treatment device, the solids were allowed to settle out of the water and the water was then tested. As is illustrated in Table I, the method and apparatus of the present invention were effective for removing most of the contaminants in the waste stream, including organic matter as measured by the drop in biochemical oxygen demand.

EXAMPLE 2

Municipal sewage discharge water was treated according to the present invention. The results are summarized in Table II.

TABLE II

| Contaminant | Raw (mg/l) | Treated (mg/l) | Percent Removal |
|---|---|---|---|
| Biochemical Oxygen Demand | 3345 | 510 | 84 |
| Total Suspended Solids | 16500 | 165 | 99 |
| Volatile Solids | 12300 | 126 | 99 |

As is illustrated in Table II, the present invention is very effective at treating municipal sewage to remove contaminants therefrom.

EXAMPLE 3

Waste water streams from a commercial dye rinsing process were treated according to the present invention. The results are summarized in Tables III–V.

TABLE III

| Contaminant | Raw (mg/l) | Treated (mg/l) | Percent Removal |
|---|---|---|---|
| Biochemical Oxygen Demand | 329 | 122 | 63 |
| Chemical Oxygen Demand | 1140 | 513 | 55 |
| ADMI Color | 1310 | 164 | 88 |
| chromium (Cr) | 0.08 | 0.05 | 38 |
| copper (Cu) | 0.33 | 0.06 | 82 |
| zinc (Zn) | 0.18 | 0.15 | 17 |
| pH | 11.9 | 9.6 | |

TABLE IV

| Contaminant | Raw (mg/l) | Treated (mg/l) | Percent Removal |
|---|---|---|---|
| Biochemical Oxygen Demand | 209 | 106 | 49 |
| Chemical Oxygen Demand | 1450 | 419 | 71 |
| ADMI Color | 6410 | 364 | 94 |
| chromium (Cr) | 0.05 | 0.005 | 90 |
| copper (cu) | 0.4 | 0.16 | 60 |
| zinc (Zn) | 0.29 | 0.20 | 31 |
| pH | 6.8 | 8.7 | |

TABLE V

| Contaminant | Raw (mg/l) | Treated (mg/l) | Percent Removal |
| --- | --- | --- | --- |
| Biochemical Oxygen Demand | 387 | 215 | 44 |
| Chemical Oxygen Demand | 1090 | 410 | 62 |
| ADMI Color | 854 | 68.5 | 92 |
| chromium (Cr) | 0.005 | 0.005 | — |
| copper (Cu) | 0.25 | 0.02 | 92 |
| zinc (Zn) | 0.43 | 0.15 | 65 |
| pH | 6.8 | 7.7 | |

ADMI is an industry measure of the amount of coloring remaining in the waste stream. As is illustrated in Tables III–V, the method and apparatus of the present invention are also very effective at treating waste streams from commercial dye operations.

EXAMPLE 4

Coal having a moisture content of about 30 percent was heated to drive of the moisture and form a hydrocarbon condensate. The condensate was treated according to the present invention and the results are summarized in Table VI.

TABLE VI

| Contaminant | Raw (mg/l) | Treated (mg/l) | Percent Removed |
| --- | --- | --- | --- |
| Aluminum | 1.9 | 0.5 | 74 |
| Ammonia | 46.6 | 22.3 | 50 |
| Arsenic | 0.067 | 0.042 | 37 |
| Barium | 0.5 | <0.1 | 80+ |
| Boron | 2.7 | 1.7 | 37 |
| Chloride | 12 | 29 | (242) |
| Chromium | 0.02 | <0.01 | 50+ |
| Copper | 0.17 | <0.01 | 94+ |
| Cyanide | 0.009 | 0.006 | 33 |
| Fluoride | 0.59 | 0.18 | 70 |
| Iron | 29.1 | 3.13 | 89 |
| Lead | 1.88 | <0.01 | 99+ |
| Manganese | 0.24 | 0.80 | (333) |
| Mercury | 0.010 | 0.004 | 60 |
| Nickel | 0.05 | 0.02 | 60 |
| Oils & Greases | 1610 | 47 | 97 |
| Phenols | 520 | 145 | 72 |
| Sulfates | 104 | 68 | 35 |
| Total Dissolved Solids | 1060 | 470 | 56 |
| Zinc | 0.27 | <0.01 | 96 |
| pH | 6.6 | 7.2 | |

It was observed that the sludge removed from the electrocoagulated water had a high BTU content and would burn, making the sludge amenable to incineration.

EXAMPLE 5

Waste effluent from a chrome plating process was treated in an apparatus according to the present invention. The chromium removal from the effluent is detailed in Table VII.

TABLE VII

| Number of Passes | Chromium (ppm) | Percent Removal |
| --- | --- | --- |
| 0 | 22.1 | — |
| 1 | 10.18 | 54 |
| 2 | 6.79 | 69 |
| 3 | 0.13 | 99 |

As is illustrated in Table VII, three passes through an apparatus according to the present invention were sufficient to remove substantially all of the chromium in the waste stream.

EXAMPLE 6

One application where the method and apparatus of the present invention are particularly applicable is in the treatment of waste water in a cooling tower. Cooling towers remove unwanted heat from production processes, work spaces or living spaces. Cooling is achieved by circulating water through a heat exchanger and/or into a sprayer where the water evaporates to remove heat. As the water evaporates, minerals and salt in the water concentrate and can form scale on the components, thereby reducing efficiency. To address this problem, the water must be treated chemically and/or be constantly removed as waste (referred to as blowdown) and fresh water must be added (make-up water).

Table VIII illustrates the effect of passing cooling tower water through the device according to the present invention for a number passes through the electrolytic device.

TABLE VIII

| Number of Passes | Solids Content (ppm) |
| --- | --- |
| 0 | 725 |
| 1 | 670 |
| 2 | 500 |
| 3 | 220 |
| 4 | 160 |
| 5 | 120 |

Figure 8:
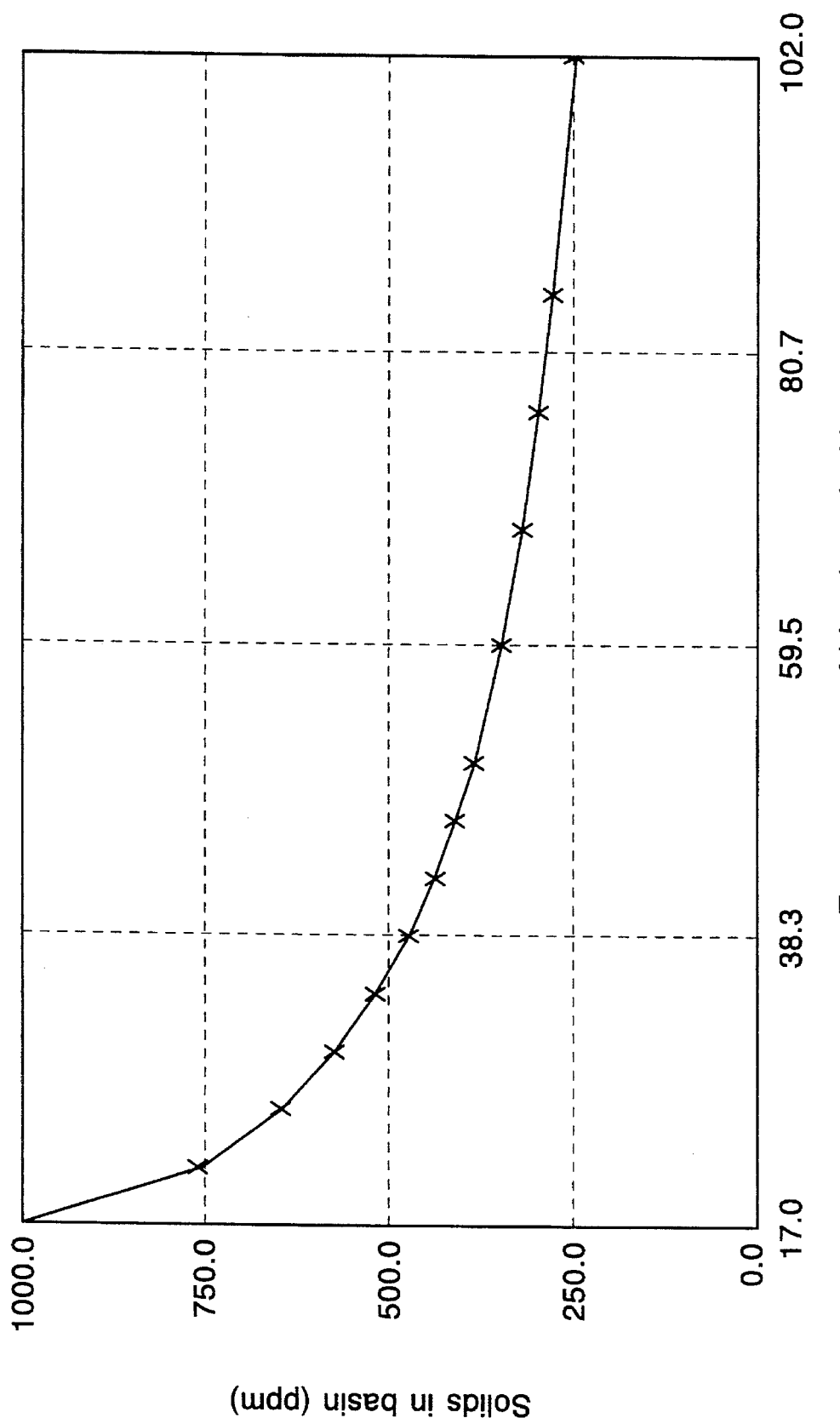
FIG. 8 illustrates a graph plotting the treatment rate versus solids content when the method and apparatus of the present invention are applied to cooling tower water.

After 4 passes through the device, the water is actually purer than the incoming make-up water, which had a solids content of about 200 ppm. FIG. 8 illustrates the effect of treating the blowdown water in the cooling tower basin. Blowdown water, which is typically disposed as waste, is treated according to the present invention and returned to the basin. As the treatment rate of the blowdown water is increased to about 120 gallons per hour (gph) the solids content of the water in the basin is reduced to about 250 ppm.

This reduced solids content will significantly reduce the amount of scaling due to solids and will reduce the amount of water that is disposed of as waste, thus reducing the amount of make-up water that is required.

While various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. A method for electrolytically treating a waste stream, comprising the steps of:

(a) polarizing said waste stream by passing said waste stream through polarizing means having an electric potential that is different than ground potential;

(b) passing said waste stream through a first electric field established between a first elongate electrode having a first potential and a second elongate electrode having a second potential that is different from said first potential;

(c) passing said waste stream through a second electric field established between said second elongate electrode and a third elongate electrode, said third elongate electrode having a third potential that is different from said second potential; and (d) treating said waste stream to remove solids therefrom and form a treated waste stream.

2. A method as recited in claim 1, wherein said waste stream comprises an aqueous-based solution.

3. A method as recited in claim 1, wherein said polarizing means comprises an elongate conductive member.

4. A method as recited in claim 3, wherein the potential of said conductive member is of the same polarity as that of at least one of said elongate electrodes.

5. A method as recited in claim 1, wherein said polarizing means comprises said first elongate electrode.

6. A method as recited in claim 1, wherein said first elongate electrode and said third elongate electrode have substantially the same electric potential.

7. A method as recited in claim 1, further comprising the step of passing said waste stream between said third elongate electrode and a fourth elongate electrode having a fourth potential that is different than said third potential.

8. A method as recited in claim 7, wherein said first elongate electrode and said third elongate electrode have substantially the same electric potential and wherein said second elongate electrode and said fourth elongate electrode have substantially the same potential.

9. A method as recited in claim 1, further comprising the step of diluting said waste stream by recycling a portion of said treated waste stream to said waste stream before said step of passing said waste stream through said first electric field.

10. A method as recited in claim 9, wherein said waste stream comprises greater than about 5 volume percent solids prior to said diluting step.

11. A method as recited in claim 1, further comprising the step of adding a coagulant to said waste stream prior to passing said waste stream between said first elongate electrode and said second elongate electrode.

12. A method as recited in claim 1, wherein said waste stream remains within an electric field for at least about 2 seconds.

13. A method as recited in claim 1, wherein said waste stream has a linear flow velocity through said first and second electric fields of at least about 5 feet per second.

14. A method as recited in claim 1, further comprising the step of reversing the polarity on said elongate electrodes.

15. A method as recited in claim 1, wherein said waste stream is a waste stream comprising cooling tower blowdown.

16. A method for electrolytically treating an aqueous-based solution comprising contaminants, comprising the steps of:

(a) contacting said aqueous-based solution with a conductive member having an electric potential above ground potential to polarize said aqueous-based solution;

(b) passing said polarized aqueous-based solution through a first electric field established between a first elongate electrode having a first potential and a second elongate electrode having a second potential that is different from said first potential;

(c) then passing said aqueous-based solution through a second electric field established between said second elongate electrode and a third elongate electrode, said third elongate electrode having a third potential that is different from said second potential; and (d) then treating said aqueous-based solution to remove solids therefrom and form a treated solution.

17. A method as recited in claim 16, wherein said first elongate electrode and said third elongate electrode have substantially the same electric potential.

18. A method as recited in claim 16, wherein said aqueous-based solution comprises up to about 5 volume percent solids.

19. A method as recited in claim 16, wherein said aqueous based solution comprises greater than about 5 volume percent solids and said method further comprises the step of recycling a portion of said treated solution to dilute said aqueous-based solution prior to said step of passing said solution through said first electric field.

20. A method as recited in claim 16, further comprising the step of reversing the polarity of said elongate electrodes.

21. An electrolytic treatment device, comprising:

(a) elongate housing means having a first end and a second end and having at least two pair of oppositely opposed interior surfaces defining a treatment chamber within said housing means;

(b) at least two elongate electrode plates secured within said treatment chamber in spaced apart relation and defining at least three elongate channels within said treatment chamber, said electrode plates having first and second ends;

(c) aperture means located at said first end of said electrode plates, wherein adjacent electrode plates comprise aperture means at opposite ends of said treatment chamber when said plates are secured within said housing to define a continuous flow path for a waste stream such that said waste stream can pass through substantially the entire length of each of said channels;

(d) means for introducing a waste stream into said treatment chamber;

(e) means for removing said waste stream from said treatment chamber; and (f) means for applying voltages to said electrode plates.

22. A device as recited in claim 21, wherein said elongate electrodes plates are metallic plates.

23. A device as recited in claim 21, wherein said electrode plates comprise plate end members at said second end of said plates adapted to electrically connect said plates to said voltage applying means.

24. A device as recited in claim 23, wherein at least a portion of said plate end members are substantially insulating.

25. A device as recited in claim 21, wherein said device comprises at least about 4 electrode plates secured within said housing.

26. A device as recited in claim 21, wherein said oppositely opposed interior surfaces comprise grooves and said electrode plates are individually removable from said housing by sliding said electrode plates out of said grooves.

27. An electrolytic treatment apparatus, comprising:

(a) an elongate conductive conduit;

(b) elongate housing means in fluid communication with said conduit, said housing means having a first end and a second end and having at least two pair of oppositely opposed interior surfaces defining a treatment chamber within said housing means;

(c) a plurality of grooves along said opposed interior surfaces adapted to receive and engage electrode plates;

(d) at least two elongate electrode plates slidably engaged within said grooves in spaced apart relation and defining at least three elongate channels within said treatment chamber;

(e) aperture means located at one end of said electrode plates, wherein adjacent electrode plates comprise aperture means at opposite ends of said electrode plates when said plates are secured within said housing to define a continuous flow path for a waste stream such that said waste stream can pass through substantially the entire length of each of said channels;

(f) means for applying voltages to said electrode plates and said conductive conduit;

(g) means for introducing a waste stream into said treatment chamber from said conductive conduit;

(h) means for removing said waste stream from said treatment chamber; and (i) means for separating solids from said waste stream after being treated in said chamber.

28. An apparatus as recited in claim 27, wherein said means for separating solids comprises a timed pump for removing sediment sludge at timed intervals.

* * * * *